United States Patent
Eggert et al.

(10) Patent No.: US 7,328,092 B2
(45) Date of Patent: Feb. 5, 2008

(54) METHOD AND DEVICE FOR MONITORING BRAKE SIGNALS IN A VEHICLE

(75) Inventors: Thomas Eggert, Karlsruhe (DE); Johannes Moosheimer, Buhl (DE); Klaus Henneberger, Buhl (DE); Klaus Kupper, Buhl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 265 days.

(21) Appl. No.: 10/906,633

(22) Filed: Feb. 28, 2005

(65) Prior Publication Data

US 2005/0189816 A1  Sep. 1, 2005

Related U.S. Application Data

(63) Continuation of application No. PCT/DE03/02912, filed on Sep. 3, 2003.

(30) Foreign Application Priority Data

Sep. 4, 2002  (DE) ............................... 102 40 841

(51) Int. Cl.
*B60T 17/22* (2006.01)
(52) U.S. Cl. .................... 701/29; 701/33; 701/70
(58) Field of Classification Search .................... None
See application file for complete search history.

(56) References Cited

U.S. PATENT DOCUMENTS

| 4,845,463 A | | 7/1989 | Didier et al. ............... 340/453 |
| 5,001,641 A | * | 3/1991 | Makino ....................... 701/76 |
| 5,016,587 A | * | 5/1991 | Berger et al. ............... 123/359 |
| 5,951,116 A | * | 9/1999 | Nagasaka et al. ............. 303/14 |
| 6,244,675 B1 | * | 6/2001 | Behrends et al. ........... 303/155 |
| 6,540,309 B1 | * | 4/2003 | Jordan et al. .......... 303/122.07 |
| 2002/0074207 A1 | * | 6/2002 | Kupper et al. ........... 192/220.1 |

FOREIGN PATENT DOCUMENTS

| DE | 3928537 | 3/1991 |
| DE | 19805089 | 8/1998 |
| DE | 10065012 | 7/2002 |
| EP | 937916 | 8/1999 |
| GB | 2317660 | 4/1998 |

* cited by examiner

*Primary Examiner*—Michael J. Zanelli
(74) *Attorney, Agent, or Firm*—Simpson & Simpson, PLLC

(57) ABSTRACT

The invention relates to a method and device for monitoring brake signals in a vehicle with a gearbox control unit and engine control unit. An error recognition or a plausibility control of said brake signals is carried out. Brake light signals can be received by a gearbox control unit or an engine control unit. Brake light switch signals can be guided by a CAN bus. A cable break or defective contacts or a short-circuit can be considered as errors.

25 Claims, 8 Drawing Sheets

| Generation of brake signals | | | | | |
|---|---|---|---|---|---|
| Brake light switch signal PCM | Brake Light Switch Signal CAN | Brake Light | Foot Brake | Foot brake OR | Foot brake AND |
| 0 | 0 | 0 | 0 | 0 | 0 |
| 0 | 0 | 0 | 1 | 1 | 0 |
| 1 | 0 | 1 | 0 | 1 | 0 |
| 0 | 1 | 1 | 0 | 1 | 0 |
| 1 | 1 | 1 | 0 | 1 | 0 |
| 0 | 1 | 1 | 1 | 1 | 1 |
| 1 | 0 | 1 | 1 | 1 | 1 |
| 1 | 1 | 1 | 1 | 1 | 1 |

Fig. 1

| Received Signals | Description |
|---|---|
| Brake Light Switch Signal PCM StopLightHw | Brake light switch signal at PIN 52 |
| Brake Light Switch signal CAN StopLightCAN | Brake light switch signal from PCM to CAN ID 360 Byte 6, Bit 3 |
| Foot brake switch signal FootBrake | Foot brake switch signal from PCM to CAN ID 360, Byte 6, Bit 4 |

Fig. 2

| OR Signal |  |
|---|---|
| Replacement value=1 | |
| Situation | Comment |
| Shifting of the reverse gear | The reverse gear can only be shifted when the brake is depressed |
| Starter Release | Starter release only with brake |
| Reverse shift block | Detection of blocked wheels is connected to the brakes |
| Mountain recognition | No calculation of $a_{diff}$ |
| Glide Function | Brake is incorporated in the beginning and end conditions of the glide function |

Fig. 3

| AND Signal |  |
|---|---|
| Replacement value=0 | |
| Situation | Comment |
| Creeping | When brakes are faulty, the vehicle creeps against the brake (driving warning). |
| TP adaptation | No sensing point adaptation (TP adaptation), if brake signal is out of service. |
| Parking Lock | No parking lock deactivation when brake signal is uncertain. |
| EOL transmission | Learning the transmission geometry, only if brake is depressed |
| EOL TP | Learning the TP only if brake is depressed. |
| Door open warning | No warning, if brake is depressed. |
| Limp-home mode | Clutch activation during limp-home operation depending on brake status. |
| Safe driving condition | condition for return to normal function (→fault management). |
| ABS signal | Plausibility check requires brake signal. |
| Shift design | If brake is depressed, the acceleration signal is "-10". |
| Plausibility check of wheel speed signals | The check of continuous, locking or faulty wheel speeds is linked to the brake signal. |

Fig. 4

| Circuit fault | | PCM | TCU | SW Signal: Brake light | DTC | Brake light |
|---|---|---|---|---|---|---|
| Short circuited ±1 with ground | with brake | 0* | 0* | 0 | No | 0 |
| | without brake | 0 | 0 | 0 | No | 0 |
| Short circuited ±1 with battery | with brake | 1 | 1 | 1 | No | 1 |
| | without brake | 1 | 1 | 1 | No | 1 |
| 1,F | with brake | 0 | 0 | 0 | No | 0 |
| | without brake | 0 | 0 | 0 | No | 0 |
| 2 | with brake | 0 | 1 | 1 | Yes | 1 |
| | without brake | 0 | 0 | 0 | No | 0 |
| 3 | with brake | 1 | F** | 1 | Yes | 1 |
| | without brake | 0 | F** | 0 | Yes | 0 |
| 4 | with brake | 1 | 1 | 1 | No | 0 |
| | without brake | 0 | 0 | 0 | No | 0 |

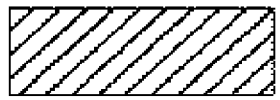 Not directly detectable

 Directly detectable fault

 Correct detection of "1"

Fig. 6

| Circuit fault | | PCM | DTC |
|---|---|---|---|
| Short circuited with ground | With brake | 1 | No |
| | Without brake | 1 | No |
| Short circuited with battery | With brake | 0 | No |
| | Without brake | 0 | No |
| a, F | With brake | 1 | No |
| | Without brake | 1 | No |
| b | With brake | 1 | No |
| | Without brake | 1 | No |

Fig. 7

| Name of braking state meter | Fault meter | Braking state 0 | 1 |
|---|---|---|---|
| Foot brake FootBrake_SC | 0..n | 0/1 | 0/1 |
| Brake light StopLightCAN_SCr | 0..n | 0/1 | 0/1 |
| Brake light StopLightHw_SC | 0..n | 0/1 | 0/1 |

Fig. 8

| Main risks from unknown faults, i.e., during the first (second) driving cycle ||||
| Single fault || Double fault ||
| 1 Signal permanent 0 (FootBrakeAND always 0) | 1 Signal permanent 1 (FootBrakeOR always 1) | Both signals permanent 0 (FootBrakeAND/OR always 0) | Both signals permanent 1** (FootBrakeAND/OR always 1) |
| - Vehicle creeps against brake<br>- No sensing point adaptation<br>- No deactivation of the parking lock | - Reverse gear can be engaged without depressing the brake | - No engagement of reverse gear<br>- Vehicle creeps against brake<br>- No sensing point adaptation<br>- No deactivation of the parking lock | - Parking lock is released without pressing the brake<br>- (no creeping**)<br>- Sensing point adaptation without brake**<br>- Reverse gear can be engaged without depressing the brake |

Fig. 11

| Serious consequences resulting from replacement values |
| --- |
| FootBrakeAND=0, FootBrakeOR=1 |
| - Vehicle creeps against the brake<br>- No sensing point adaptation<br>- Reverse gear can be engaged without depressing the brake<br>- No release of the parking lock |

Fig. 12

| | | Hand brake changes from "0"→"1" | | |
|---|---|---|---|---|
| FootBrakeOR | AND | OR | AND | Max. 3s after ignition |
| | | Gear changes from "D"/"R"→"N" | | |
| | | OR | | |
| | | Pedal > 50% | | |

Fig. 13

| | | Hand brake changes from "0"→"1" | | |
|---|---|---|---|---|
| FootBrakeOR | AND | OR | AND | Max. 3s after start of engine |
| | | Gear changes from "N"→"D"/"R" | | |
| | | OR | | |
| | | Pedal > 50% | | |
| Pedal > 50% | AND | Gear changes from "N"→"D"/"R" | AND | In 3s |
| "N"→"D"→"R" OR "R"→"D"→"D" | AND | In 200 ms | | |

Fig. 14

METHOD AND DEVICE FOR MONITORING BRAKE SIGNALS IN A VEHICLE

CROSS-REFERENCE TO RELATED APPLICATIONS

This application is filed under 35 U.S.C. §120 and §365(c) as a continuation of International Patent Application PCT/DE2003/002912, filed Sep. 3, 2003, which application is incorporated herein by reference. This application also claims priority of German Patent Application 102 40 841.6, filed Sep. 4, 2002, which application is incorporated herein by reference.

BACKGROUND OF THE INVENTION

The present invention relates to a method and a device for monitoring brake signals in a vehicle having a transmission control unit and an engine control unit.

Especially in vehicles having an automatic transmission, a plurality of signals and data for controlling the transmission and the motor are required. For example, brake signals are also used to control the vehicle.

BRIEF SUMMARY OF THE INVENTION

The present invention is a method and a device for monitoring brake signals as mentioned above in order to further increase the control of a vehicle.

This may be achieved via a method of the invention for monitoring brake signals in a vehicle having a transmission control unit and an engine control unit in which a fault detection and/or a plausibility check of the different brake signals is carried out. In particular, a method for monitoring a brake system of a vehicle having a transmission control unit and an engine control unit is provided where the method includes the step of monitoring a plurality of brake signals to detect a brake system fault or a plausibility (probability) of a brake system fault. Preferably, in the monitoring of the brake signals, a plurality of signals are received and monitored by the transmission control unit where the signals are selected from at least a foot brake light signal from a vehicle network, a brake light signal from the vehicle network, and a brake light switch signal from the engine control unit.

BRIEF DESCRIPTION OF THE DRAWINGS

FIG. 1 shows a table having an overview of the signal combinations and the signal generations of a method according to the invention;

FIG. 2 shows a table having the signals received by the transmission control unit;

FIGS. 3 and 4 show tables having situations with AND operators and with OR operators;

FIG. 6 shows a table having possible faults in the detection;

FIG. 7 shows circuit faults for the brake switch indicated in a table;

FIG. 8 shows braking state meters listed in a table;

FIG. 11 shows risks occurring from undetected faults;

FIG. 12 shows possible consequences resulting from replacement values;

FIG. 13 shows a strategy for the release of the parking brake in a fault detection; and FIG. 14 shows a strategy for the engagement of a forward gear or of the reverse gear in the event of a fault detection.

DETAILED DESCRIPTION OF THE INVENTION

Figure 5:
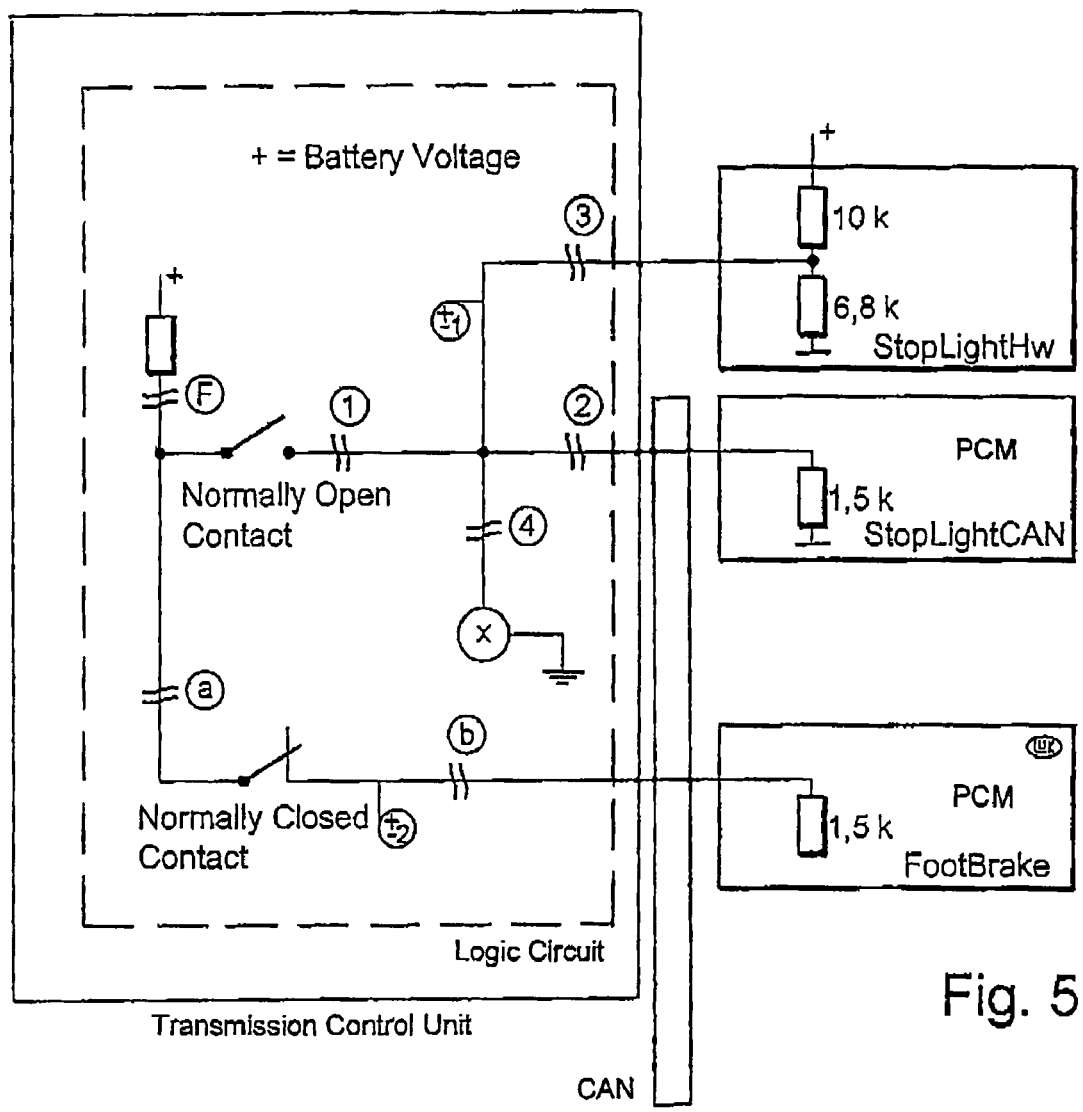
FIG. 5 shows a circuit diagram for the evaluation of a brake signal.

In the method according to the invention, in the monitoring operation a foot brake light switch signal and/or a brake light switch signal may be received by a vehicle network as brake signals and/or a brake light switch signal from the engine control unit and transferred from the network to the transmission control unit. It is also conceivable that other suitable signals may be used in order to produce or further improve an evaluation of the brake signals and a determination of replacement values and/or replacement strategies.

In this way, preferably three different brake signals from different sources are available for the detection of a brake actuation. A signal still comes from the footbrake switch and the other two signals repeat the state of the brake light switch at that time. The goal is to validate these three signals against each other and to generate and use at least two logic operator signals to be evaluated by the strategy. A correct detection of the brake signal is crucial for the performance of the transmission control unit (TCU). The transmission control unit, as already described above, is able to receive three brake signals, a brake light switch signal and a brake switch signal being sent from the engine control unit (PCM) via the CAN bus so that the brake light signal can be redundantly monitored.

Preferably, an AND-operator (FootBrakeAND) and an OR operator (FootBrakeOR) from a foot brake switch and a brake light may be used as operator signals. If a rapid reaction to the brake signal that is less critical for the brake is to be carried out, the FootBrakeOR signal can preferably be used. In functions in which it must be ensured that the brake is actuated, the FootBrakeAND signal can preferably be used.

According to a further development of the invention, the brake signals for fault detection during and/or after a given driving cycle are observed or evaluated.

Within the context of an advantageous embodiment of the invention, it may be provided that the length of a driving cycle is determined by observing whether a gear is engaged that is higher than second gear and/or the vehicle speed is greater than 16 km/h and/or the ignition has been switched on for at least 2 minutes. However, other definitions are also conceivable.

According to a further development, a check may preferably be made after a driving cycle has terminated at each brake signal of whether state "1" and state "0" have been run through. Independent of whether the contact is normally open or normally closed, value 1 means that the brake is actuated, and value 0 means that the brake is not actuated.

In the monitoring of the brake signals, a plurality of brake state meters, for example, may be used. Possibly, the number of faults for each brake state meter may be increased if the brake signal does not reach both braking states during a driving cycle. During a driving cycle, a signal correlation between the values of the brake light and the foot brake is not possible, because, as a result of the structure of the two brake switches, the intermediate states (StopLight=1 & FootBrake=0) and (StopLight=0 & FootBrake=1) are plausible.

If the ignition is switched off and the driving cycle has been run through completely, a check may be made for each brake signal of whether both states "1" (brake actuated) and "0" (brake not actuated) have been run through. In order to be able to realize this, three braking state meters may preferably be used. The number of faults in a braking state meter increases with each driving cycle in which the brake signal has not reached both braking states. If the braking state meter adopts the number n, a diagnostic trouble code (DTC) or the like may be set. The bits for the braking state are set to "1" if the particular braking state is reached during the driving cycle.

It must be noted that, if a brake signal has not reached both braking states, it is not 100% certain that there is a fault, because the plausible state (StopLight≠FootBrake) is kept during the entire driving cycle. Therefore, the driving cycle should be completely terminated before an evaluation is carried out.

It is conceivable that the signal StopLightHw in particular is seen even after the ignition is switched off. Moreover, it is possible to perform a fault detection when there are loose contacts. For example, the state meters may be expanded by a state change meter that is capable of detecting loose contacts. This state change meter may be increased by each state change for each brake signal "0"→"1" or "1"→"0".

After the ignition is switched off, the state change meter may adopt higher values than the other meters, that may be across a loose contact thus causing the fault meter to increase in number of recorded faults.

Because it is plausible that the state (StopLight≠FootBrake) is often reached, it is possible that one of the two brake light switches is in position (actuated) "1" multiple times. This makes a loose contact difficult to detect and it should be carried out very carefully, i.e., only when there is a great difference between the meters should an increase of the fault meter be permitted.

Reactions to the different faults are described below. In this context, preferably four different fault types may be considered:
A detected fault during the driving cycle;
AC detected CAN fault during the driving cycle;
B detected fault after the driving cycle; and
C detected fault after the driving cycle.

However, other fault types may also be used.

Moreover, reactions to detected faults are described. If faults A and AC are detected, a diagnostic trouble code (DTC) may be set immediately. The diagnostic trouble code for faults B and C are preferably set after the evaluation of the brake state meter, after the ignition has been switched off if the fault meter adopts the value n.

Moreover, the measurement or the calculation of the fault is described. For example, different replacement measurements may be carried out as a function of the particular fault type. Thus, a fault detection of a signal failure or a signal plausibility test and a formation of replacement values that ensure the availability of the vehicle may be produced. Moreover, additional strategies for canceling the replacement values and measures are proposed.

Moreover, risks are described that occur as a result of undetected faults if, for example, the combined brake light signal or foot brake signal is faulty. The signal correlation process detects faults preferably after the first driving cycle with a permanently present fault. Consequently, a driving cycle with an undetected fault may be carried out as the first driving cycle.

In general, the engagement of the reverse gear without depressing the brake is considered a high risk. The same high risk also exists for the change from the neutral state (N) to drive mode (D). Therefore, it is proposed that an N-D mode change is only allowed if the brake is depressed or operated.

Moreover, substitute strategies are proposed, especially for the signal FootBrakeAND. This signal may preferably always adopt the value "0". First, the release of the parking lock in a case involving a fault is considered. If the FootBrakeAND signal is always 0, the parking lock is never released. In order to release it without the vehicle safety being reduced, different signal combinations are conceivable for a driver detection.

The engagement of a forward gear or the reverse gear in a case involving a fault is also considered. If the change from neutral (N) to drive (D) or to reverse (R) occurs as a function of the software signal FootBrakeAND, a similar emergency running strategy is required for the engagement of the gears.

The proposed strategy may also be expanded by the FootBrakeAND signal.

Furthermore, the cancellation of the fault is considered. In the case of directly detected faults, the diagnostic trouble code of fault types A and AC are canceled if the signals are correctly received again.

In the case of indirectly detected faults, it may be provided that if the number of faults of the braking state meter for one of the brake signals is not equal to 0, this brake signal is not considered at the beginning of the next driving cycle. However, other reactions in the fault detection are also conceivable.

The resetting of the meter to the value 0 may be different for fault types B and C. If the meter adopts the value 0, the signal may be validated and taken into consideration again for the braking state evaluation.

The fault meter is reset to the value 0 if for fault type B both states for the brake ("1" and "0") are run through during the driving cycle and the unallowed signal and the FootBrakeOR signal adopt the value "1".

For fault type C, the fault meter may be reset to the value 0 after the ignition is switched off if both states have been run through for the brake ("1" and "0").

As soon as the fault meter is reset to the value 0 and the brake signal is again permitted, the diagnostic trouble code may be canceled if none of the fault meters adopts the value n.

The proposed strategy for the evaluation and correlation of a plurality of brake signals may also be further appropriately modified. In the strategy of the present invention, it is especially advantageous, in comparison to known procedures, that the possibilities of fault detection, such as in the event of a cable break, a short circuit with the ground or with the battery or the like, are substantially improved by the detection state after a driving cycle. Moreover, the vehicle safety is substantially improved by the formation of replacement values, especially in the event of significant faults. Thus, the vehicle is no longer limited in its functions, e.g., by a non-safety-critical faulty brake signal. In this way, the availability of the vehicle is increased without the vehicle safety being reduced in the process.

Within the context of the method of the present invention, some braking states of the vehicle may be detected as faulty while driving, such as in the event of a cable break or the like. Other braking states may be detected only after termination of a driving cycle. In order to enable this, a driving cycle is used in which it is ensured that the brake has been actuated and also released again. After termination of the driving cycle, it is possible to check whether all available brake signals have run through the states "Brake depressed" and "Brake not depressed" during the driving cycle. If this is not the case for a signal, this signal may preferably no longer be used for the signal evaluation during the next driving cycle. This can occur until this signal has been detected as plausible again.

If all brake signals have adopted only one state after the termination of the driving cycle, preferably the replacement values for the output signals accordingly may be set immediately. The fault reactions caused by these faults may be canceled only after termination of a correct driving cycle.

The object of the present invention may also be achieved, especially for carrying out the proposed method, via a device for monitoring brake signals in a vehicle having a transmission control unit and an engine control unit in which a fault detection and/or a plausibility check of the different brake signals is provided by the transmission control unit.

Further advantages and advantageous embodiments arise from the dependent claims and the drawings described below.

In FIG. 1 a table is depicted having an overview of the signal combinations and the signal generations of the method according to the invention, the brake light switch signal of the engine control unit and of the CAN vehicle network as well as the brake light and the foot brake being recorded in different columns. Moreover, the two logic operator signals FootBrakeOR and FootBrakeAND are shown. In this context, it must be noted that "0" means that the brake is not actuated and the "1" means that the brake is actuated.

The signals received by the transmission control unit are depicted in FIG. 2 in the form of a table.

In FIGS. 3 and 4, additional tables are shown that indicate particular situations in which the AND-operator and the OR-operator are used, the OR-operator being indicated in FIG. 3 and the AND-operator being indicated in FIG. 4.

For the evaluation of the brake signals, a suitable fault detection may be used. For this purpose, a circuit diagram is shown in FIG. 5 in which the brake light signals from the transmission control unit and the engine control unit (PCM=Powertrain Control Module) and the foot brake from the engine control unit (PCM) are shown.

In FIG. 6, a table with possible faults in the detection is shown. Independent of whether the contact is normally open or normally closed, value 1 means that the brake is actuated, and value 0 means that the brake is not actuated. The state in which the protection is triggered (the same as in Case 1) if the switch is closed is labeled "*". "F**" means that a cable brake is detected if the voltage across terminal PIN52 is between 0.5V and 3.5V. It must be noted that when there is a cable break, an incorrect state "1" (brake actuated) is never detected.

It is evident from the table that the cases involving a short circuit are not directly detectable. Furthermore, Case 2 involves only the case in which StopLightHw=1 and StopLightCAN=0, whereby a diagnostic trouble code (DTC) is set. Case 3 is detected by the voltage level across terminal PIN 52. The replacement value for 30 StopLightHw is 0. A diagnostic trouble code (DTC) is set.

The case that StopLightHw=0 and StopLightCAN=1 without the detection of a cable break (F) is found when there is a double fault. However, this case is improbable.

The software signal brake light (Stoplight) is obtained via the OR-operator for the signals StopLightHw and StopLightCAN. What results is:

StopLight=(StopLightHw or StopLightCAN).

This results in the table depicted in FIG. 7 in which possible circuit faults for the brake switch are indicated. Therefore, it must be noted that "*" means that if the switch is closed, the protection is triggered (the same as in Case 1,F in FIG. 6). It must also be noted that when there is a cable break, an incorrect state "0" (brake not actuated) is never detected.

If the ignition is switched off and the driving cycle has been run through completely, a check may be made for each brake signal of whether both states "1" (brake actuated) and "0" (brake not actuated) have been run through. For this purpose, three brake state meters may be used, which are listed in a table in FIG. 8. The number of faults increases with each driving cycle in which the brake signal did not reach both braking states. If the meter is equal to n, a diagnostic trouble code (DTC) is set. The bits for the braking state are set to "1" if the particular braking state is reached during the driving cycle.

Figure 9:
FIG. 9 shows braking state meters listed in a table.

Moreover, it is possible to perform a fault detection when there are loose contacts. For example, the state meters may be expanded by a state change meter that is capable of detecting loose contacts. This state change meter increases due to each state change for each brake signal "0"→"1" or "1"→"0". This is shown in the form of a table in FIG. 9.

Figure 10:
FIG. 10 shows reactions to different fault types listed in a table.

In FIG. 10 reactions to the different faults are described in a table. In this context four fault types may preferably be considered:

A Detected fault during the driving cycle:
  Faults 2 and 3 can be detected directly.
AC Detected CAN fault during the driving cycle:
  e.g. CAN ID 360 does not receive any more signals;
  the StopLightCAN and FootBrake signals are not present (see Can fault);
  if ID 360 (PCM) is not transmitting, transmission control unit TCU also is no longer functioning, because the engine torque signal is also not present.
B Detected fault after the driving cycle:
  Evaluation of the braking state meters;
  At least one brake signal should have reached both states (0/1).
C Detected fault after the driving cycle:
  Evaluation of the braking state meters;
  No brake signal reaches both states (0/1).

If faults A and AC are detected, a diagnostic trouble code (DTC) may be set immediately. The diagnostic trouble code for faults B and C are preferably set after the evaluation of the braking state meter, after the ignition has been switched off, if the fault meter adopts the value n.

Moreover, the measurement or the calculation of the fault is described. For example, different replacement measurements may be carried out as a function of the particular fault type, which is evident from the table shown in FIG. 10.

Moreover, it must be noted that "*" denotes that other measurements are possible instead of or in addition to FixXe. Furthermore, "" can denote that n may preferably adopt values in the range from approximately 3 to 5. Finally, "*" may denote that the fault meter adopts values that are preferably greater than the value 0.

In FIG. 11, risks are described that occur as a result of undetected faults. The table shown in FIG. 11 shows the significant risks if the combined brake light signal or foot brake signal is faulty. The signal correlation process detects faults only after the first driving cycle with a permanently present fault. Consequently, a driving cycle with an undetected fault would be carried out as a first driving cycle.

In the table of FIG. 11, a possible engagement of the reverse gear is denoted by the AND-signal. "**" denotes the worst case, in which the vehicle can start off in first gear without a hand brake. With each sensing point adaptation, the vehicle begins to move.

In the table of FIG. 12, the consequences resulting from replacement values are described. The table shows the critical situations if the replacement values (FootBrake-AND=0, FootBrakeOR=1) are set incorrectly.

Moreover, substitute strategies are proposed, especially for the FootBrakeAND signal. This signal may preferably always adopt the value "0". First, the release of the parking lock in a case involving a fault is considered. If the Foot-BrakeAND signal is always 0, the parking lock is never released. In order to release the parking brake without the vehicle safety being reduced, different signal combinations for a driver detection are conceivable. This is also evident from the table in FIG. 13:

The engagement of a forward gear or the reverse gear in a case involving a fault is also considered, and is shown in FIG. 14. If the change from neutral (N) to drive (D) or to reverse (R) occurs as a function of the software signal FootBrakeAND, a similar emergency running (limp-home) strategy is required for the engagement of the gears.

The table shown in FIG. 14 represents a strategy that preferably is used when the vehicle is at a standstill. The strategy may also be expanded by the FootBrakeAND signal.

What is claimed is:

1. A method for monitoring a brake system of a vehicle having a transmission control unit and an engine control unit comprising monitoring a plurality of brake signals to detect at least one of a brake system fault and a plausibility of a brake system fault wherein, in the monitoring of the brake signals, a plurality of signals are received and monitored by the transmission control unit where the signals are selected from a foot brake light signal from a vehicle network, a brake light signal from the vehicle network, and a brake light switch signal from the engine control unit.

2. The method as described in claim 1, wherein the brake signals are validated against each other using at least one logic circuit.

3. The method as described in claim 2, wherein at least one AND-operator circuit and at least one OR-operator circuit are used to compare the brake signals to each other.

4. The method as described in claim 1, wherein the brake signals are monitored during a driving cycle, after the driving cycle or both during and after the driving cycle.

5. The method as described in claim 4, wherein the length of the driving cycle is determined by observing at least one of whether a gear is engaged that is higher than second gear, the vehicle speed is greater than 16 km/h and the ignition is switched on for at least 2 minutes.

6. The method as described in claim 4 wherein, after the driving cycle is terminated, a check is made at each brake signal of whether a first brake actuated state (state "1") and a second brake not actuated state (state "0") have occurred during the driving cycle.

7. The method as described in claim 6, wherein, in the monitoring of the brake signals, at least one braking state meter is used to detect and record braking states.

8. The method as described in claim 7, wherein a number of faults recorded for each brake state meter may be increased if the brake signal does not reach both braking states "1" and "0" during a driving cycle.

9. The method as described in claim 8, wherein if the braking state meter records a predetermined number of faults n, a diagnostic trouble code (DTC) is set by the transmission control unit.

10. The method as described in claim 9 wherein the number of faults recorded by the braking state meter is increased by at least one for the detection of a loose contact.

11. The method as described in claim 10 wherein different fault types are taken into consideration.

12. The method as described in claim 11, wherein at least one of fault types (A), (AC), (B) and (C) are detected where fault type (A) is detected during a driving cycle, wherein fault type (AC) is a vehicle network (CAN) fault in the vehicle network during a driving cycle, fault type (B) is a fault after a terminated driving cycle in which the braking state meter is evaluated and at least one brake signal has reached both braking states "0" and "1", and fault type (C) is a fault after a terminated driving cycle in which the braking state meter is evaluated and no brake signal has reached both braking states "0" and "1".

13. The method as described in claim 12, wherein, if fault types (A) and (AC) are detected, a diagnostic fault code (DTC) is immediately set.

14. The method as described in claim 13, wherein the diagnostic trouble code (DTC) for directly detected fault types (A) and (AC) is canceled if the brake signals are correctly received with respect to a subsequent driving cycle.

15. The method as described in claim 12, wherein, if fault types (B) and (C) are detected, a diagnostic trouble code (DTC) is set only after the evaluation of the braking state meter after the ignition is switched off if the fault meter adopts the value n.

16. The method as described in claim 15, wherein, fault reactions caused by errors are canceled only after conclusion of a correct driving cycle.

17. The method as described in claim 15, wherein, when fault types are indirectly determined, a corresponding brake signal is not considered at the beginning of the next driving cycle if the fault meter of the braking state meter does not adopt the value 0.

18. The method as described in claim 15, wherein resetting of the braking state meter to the value 0 is different for the fault types (B) and (C), the signal being validated and reconsidered for the braking state evaluation if the braking state meter adopts the value 0.

19. The method as described in claim 18, wherein the braking state meter is reset to the value 0 if for fault type (B) both states "0" and "1" have been reached during the driving cycle.

20. The method as described in claim 18, wherein, when there is a fault type (C), the braking state meter is reset to 0 after the ignition is switched off if both states "1" and "0" have been reached during the driving cycle.

21. The method as described in claim 11, wherein different replacement values are used as a function of the particular fault type.

22. The method as described in claim 21, wherein, if all brake signals after the termination of the driving cycle have adopted only one state, replacement values are set accordingly.

23. The method of claim 1, wherein a fault detection and/or a plausibility check of the different brake signals is provided by the transmission control unit.

24. An apparatus for monitoring a brake system of a vehicle having a transmission control unit and an engine control unit, brake operation signals and circuitry for monitoring a plurality of brake signals to detect a brake system fault or a plausibility of a brake system fault wherein, the transmission control unit contains circuits for receiving a plurality of brake signals and monitoring them and a foot brake switch and a foot brake light signaling apparatus are provided for providing signals to the transmission control unit through a vehicle network, and for providing a brake light switch signal to the transmission control unit through the engine control unit.

25. The apparatus as described in claim 24, wherein at least one logic circuit is provided within the transmission control unit for validating the brake signals against each other.

* * * * *